US008200017B2

(12) United States Patent
Liang et al.

(10) Patent No.: US 8,200,017 B2
(45) Date of Patent: Jun. 12, 2012

(54) FACE ALIGNMENT VIA COMPONENT-BASED DISCRIMINATIVE SEARCH

(75) Inventors: Lin Liang, Beijing (CN); Fang Wen, Beijing (CN); Jian Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 906 days.

(21) Appl. No.: 12/245,711

(22) Filed: Oct. 4, 2008

(65) Prior Publication Data

US 2010/0086214 A1 Apr. 8, 2010

(51) Int. Cl.
*G06K 9/00* (2006.01)
*G06K 9/68* (2006.01)
*G05B 19/00* (2006.01)

(52) U.S. Cl. ........ 382/181; 382/118; 382/151; 382/227; 340/5.82

(58) Field of Classification Search .................. 382/115, 382/124, 118, 173, 155–156, 159, 224, 227, 382/151; 340/5.83, 5.82, 5.52, 5.53; 713/186; 345/173; 600/476; 706/2, 26, 45, 52
See application file for complete search history.

(56) References Cited

U.S. PATENT DOCUMENTS

| | | | |
|---|---|---|---|
| 6,188,776 B1 | 2/2001 | Covell et al. | |
| 6,381,346 B1 * | 4/2002 | Eraslan | 382/118 |
| 6,504,546 B1 * | 1/2003 | Cosatto et al. | 345/473 |
| 7,058,205 B2 | 6/2006 | Jepson et al. | |
| 7,254,257 B2 | 8/2007 | Kim et al. | |
| 7,274,822 B2 * | 9/2007 | Zhang et al. | 382/224 |
| 7,720,284 B2 * | 5/2010 | Zhang et al. | 382/173 |
| 7,965,875 B2 * | 6/2011 | Ionita et al. | 382/118 |
| 2003/0065255 A1 * | 4/2003 | Giacchetti et al. | 600/407 |
| 2005/0102246 A1 | 5/2005 | Movellan et al. | |
| 2006/0067591 A1 * | 3/2006 | Guzzwell et al. | 382/289 |
| 2007/0172099 A1 | 7/2007 | Park et al. | |
| 2007/0223790 A1 | 9/2007 | Xiao et al. | |
| 2008/0013798 A1 | 1/2008 | Ionita et al. | |
| 2008/0063263 A1 | 3/2008 | Zhang et al. | |

OTHER PUBLICATIONS

Zhang, et al., "Robust Face Alignment Based on Local Texture Classifiers", International Conference on Image Processing, ICIP 2005. IEEE, pp. 354-357.
Kim, et al., "Component-Based LDA Face Description for Image Retrieval and MPEG-7 Standardisation", Image and Vision Computing 23, 2005, pp. 631-642.
Dorko, et al., "Object Class Recognition Using Discriminative Local Features", Submitted to IEEE Transactions on Pattern Analysis and Machine Intelligence, Oct. 25, 2004, pp. 1-26.
Zhang, et al., "Robust Face Alignment Based on Hierarchical Classifier Network", IEEE, 2005, pp. 354-357.
Shai Avidan, "Support vector tracking", IEEE Transactions on Pattern Analysis and Machine Intelligence, vol. 26, Issue 8, Aug. 2004, 8 pages.
Chen, et al., "Example-based facial sketch generation with non-parametric sampling", Proceedings of Eighth IEEE International Conference on Computer Vision, ICCV 2001, vol. 2, pp. 433-438.

(Continued)

*Primary Examiner* — Sheela Chawan
(74) *Attorney, Agent, or Firm* — Gonzalez Saggio & Harlan LLP

(57) ABSTRACT

Described is a technology in which face alignment data is obtained by processing an image using a component-based discriminative search algorithm. For each facial component, the search is guided by an associated directional classifier that determines how to move the facial component (if at all) to achieve better alignment relative to its corresponding facial component in the image. Also described is training of the classifiers.

20 Claims, 6 Drawing Sheets

OTHER PUBLICATIONS

Cootes, et al., "Active appearance models", IEEE Transactions on Pattern Analysis and Machine Intelligence, vol. 23, No. 6, 2001, pp. 681-685.

Cootes, et al., "Constrained Active Appearance Models", Proceedings of Eighth IEEE International Conference on Computer Vision, vol. 1, 2001, pp. 748-754.

Cootes, et al., "A Mixture Model for Representing Shape Variation", 1997, 1 page.

Cristinacce, et al., "Boosted Regression Active Shape Models", Proc. British Machine Vision Conference, vol. 2, 2007, pp. 880-889.

Cui, et al., "EasyAlbum: An Interactive Photo Annotation System Based on Face Clustering and Re-ranking", CHI ACM Proceedings, Photo Sharing, 2007, pp. 367-376.

Gu, et al., "3D Alignment of Face in a Single Image", IEEE International Conference on Computer Vision and Pattern Recognition, New York, NY, Jun. 17-22, 2006, pp. 1-8.

Li, et al., "Multi-View Face Alignment Using Direct Appearance Models", Proceedings of the Fifth IEEE International Conference on Automatic Face and Gesture Recognition (FGR'02), 2002, pp. 1-6.

Li, et al., "Tracking in Low Frame Rate Video: A Cascade Particle Filter with Discriminative Observers of Different Lifespans", IEEE Conference on Computer Vision and Pattern Recognition, Volume , Issue , Jun. 17-22, 2007, pp. 1-8.

Liang, et al., "Accurate Face Alignment using Shape Constrained Markov Network", Proceedings of the 2006 IEEE Computer Society Conference on Computer Vision and Pattern Recognition (CVPR'06), 8 pages.

Liu, et al., "Hierarchical Shape Modeling for Automatic Face Localization", Proceedings of the 7th European Conference on Computer Vision—Part II, vol. 2351, 2002, pp. 687-703.

Xiaoming Liu, "Generic Face Alignment using Boosted Appearance Model", IEEE Conference on Computer Vision and Pattern Recognition, CVPR '07, Jun. 17-22, 2007, pp. 1-8.

Matthews, et al., "Active Appearance Models Revisited", 2004, 53 Pages.

Williams, et al., "Sparse Bayesian Learning for Efficient Visual Tracking", IEEE Transactions on Pattern Analysis and Machine Intelligence, vol. 27, No. 8, Aug. 2005, pp. 1292-1304.

Phillips, et al., "The feret evaluation methodology for face recognition algorithms", IEEE Transactions on Pattern Analysis and Machine Intelligence, vol. 22, No. 10, Oct. 2000, pp. 1090-1104.

Romdhani, et al., "A Multi-View Nonlinear Active Shape Model Using Kernel PCA", BMVC, 1999, pp. 483-492.

Sim, et al., "The CMU Pose, Illumination, and Expression Database", IEEE Transactions on Pattern Analysis and Machine Intelligence, vol. 25, No. 12, Dec. 2003, pp. 1615-1618.

Tu, et al., "Face Localization via Hierarchical condensation with Fisher Boosting Feature Selection", Proceedings of the 2004 IEEE Computer Society Conference on Computer Vision and Pattern Recognition (CVPR'04), 2004, 6 pages.

Viola, et al., "Robust Real-Time Face Detection", International Journal of Computer Vision 57(2), 2004, pp. 137-154.

Wiskott, et al., "Face Recognition by Elastic Bunch Graph Matching", CRC Press, ISBN 0-8493-2055-0, Chapter 11, 1999, pp. 1-23.

Yuille, et al., "Feature extraction from faces using deformable templates", IEEE Computer Society Conference on Computer Vision and Pattern Recognition, Proceedings CVPR '89, 1989, pp. 104-109.

Zhou, et al., "Bayesian Tangent Shape Model", IEEE Computer Society Conference on Computer Vision and Pattern Recognition, vol. 1, Jun. 18-20, 2003, pp. 109-116.

* cited by examiner

FACE ALIGNMENT VIA COMPONENT-BASED DISCRIMINATIVE SEARCH

BACKGROUND

Fitting a shape or template to a given image has been studied many years in computer vision. The goal of face alignment is to match a two-dimensional face shape or appearance with a facial image. Applications of face alignment range from face recognition, face tracking, facial expression analysis, three-dimensional face modeling, to face cartoon animation.

Today, with the explosively increasing number of face photographs on the web and the desktop, new applications such as face search and annotation have raised new requirements for face alignment applications, including being fully automatic, efficient, and robust to facial images in under-controlled conditions. Any improvements in face-alignment applications are desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which face alignment data is obtained through a discriminative search based upon facial components. In one aspect, facial components (e.g., representing eyes, a mouth, a nose and so on) are moved relative to an image by trained directional classifiers, so as to align each component with its corresponding position in the image. A shape corresponding to shape data having the best alignment score is selected as output data representative of the face within the image.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a component-based discriminative approach for face alignment that does not require initialization, and only needs a rough face location given by an appropriate face detector. Unlike conventional approaches, the technology described herein searches the face shape in a large range at the component level by a discriminative search algorithm. More particularly, a set of directional classifiers guide the search of the configurations of facial components among multiple detected modes of facial components. The directional classifiers are learned using a large number of aligned local patches and misaligned local patches from training data. The discriminative search is extremely effective and able to find very good alignment results only in a few (e.g., two to three) search iterations.

While some of the examples described herein are directed towards certain facial features, it is understood that these are only examples. For instance, other facial features may be used, and not all of those that are exemplified need be used in a given implementation. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image processing in general.

Figure 1:
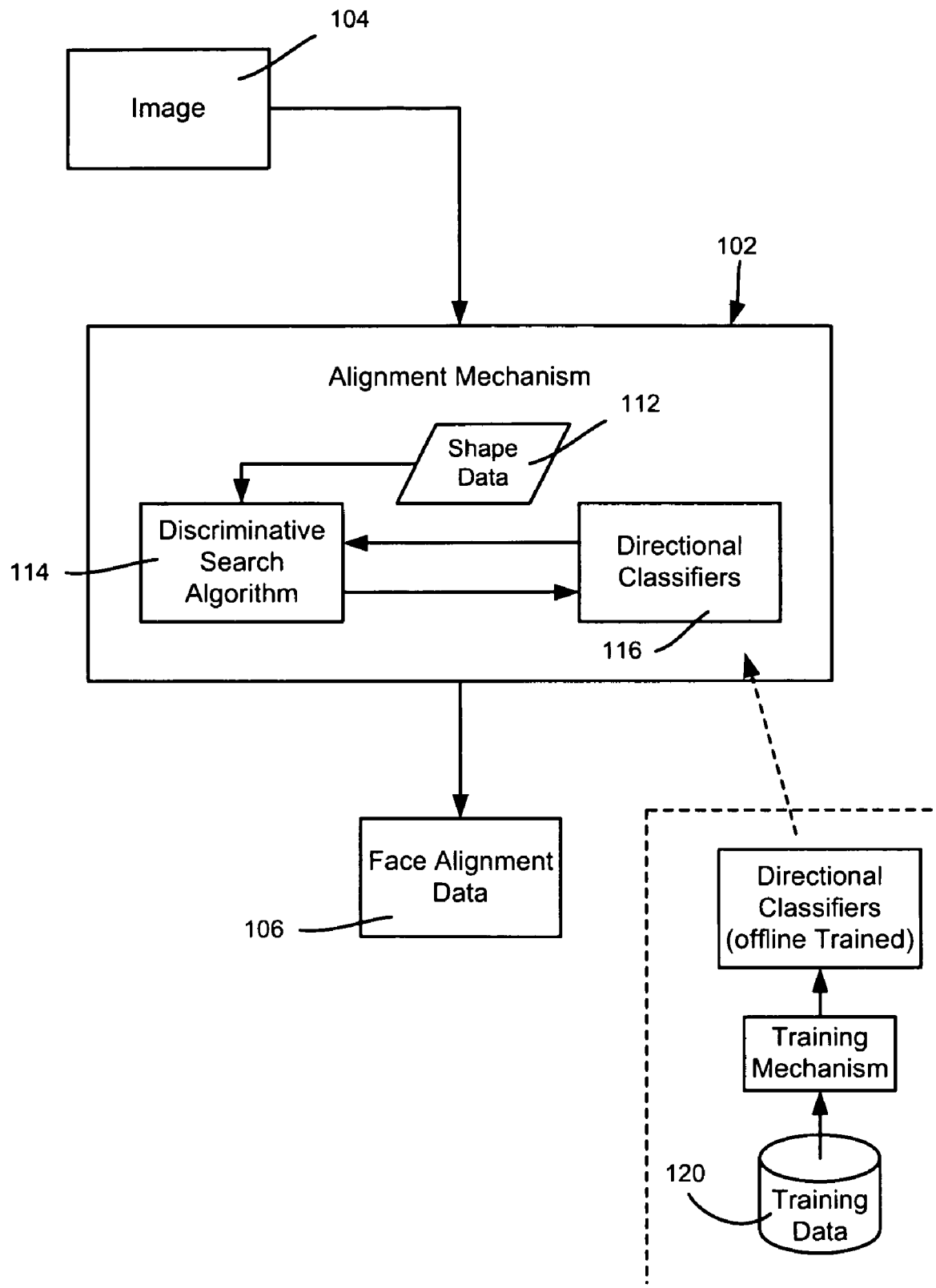
FIG. 1 is a block diagram showing example components for implementing face alignment via a component-based discriminative search.

Turning to FIG. 1, there is shown a general block diagram in which an alignment mechanism 102 processes an image 104 to provide face alignment data 106 (e.g., representing facial features) corresponding to a face within the image 108. As described below, the alignment mechanism 102 works with shape data 112 via a discriminative search algorithm 114 and directional classifiers 116.

Generally described herein is a component-based discriminative approach to address the efficiency and robustness problems of existing facial alignment techniques. The described approach searches the face shape at the facial component level, and first detects a number of candidate modes for facial components (e.g., eyes, nose, mouth, and profiles). From these modes, the alignment mechanism 102 constructs an initial shape, as represented by the shape data 112.

Thereafter, the discriminative search algorithm 114 searches for a new position for each facial component. The searching direction is determined by the learned directional classifiers 116. As will be understood, the searching step is adaptively set according to the candidate modes.

For each facial component, nine directional classifiers (eight directions plus one of "no move") are trained (e.g., offline) on aligned and misaligned local patches from training data 120 in the mean shape coordinates. Using the discriminative search among candidate modes, better configurations of facial components are effectively and rapidly discovered, even in a very large searching range. The shape is further refined using the components as constraints.

The search algorithm is a deterministic algorithm that optimizes the shape at the component level among candidate modes, providing the ability to jump out of local minimums; how to search facial components is learned from the training data. Note that the directional classifiers are trained on a large number of positive examples and negative examples. The search is fully automatic and does not require initialization as do other face alignment systems.

Figure 2:
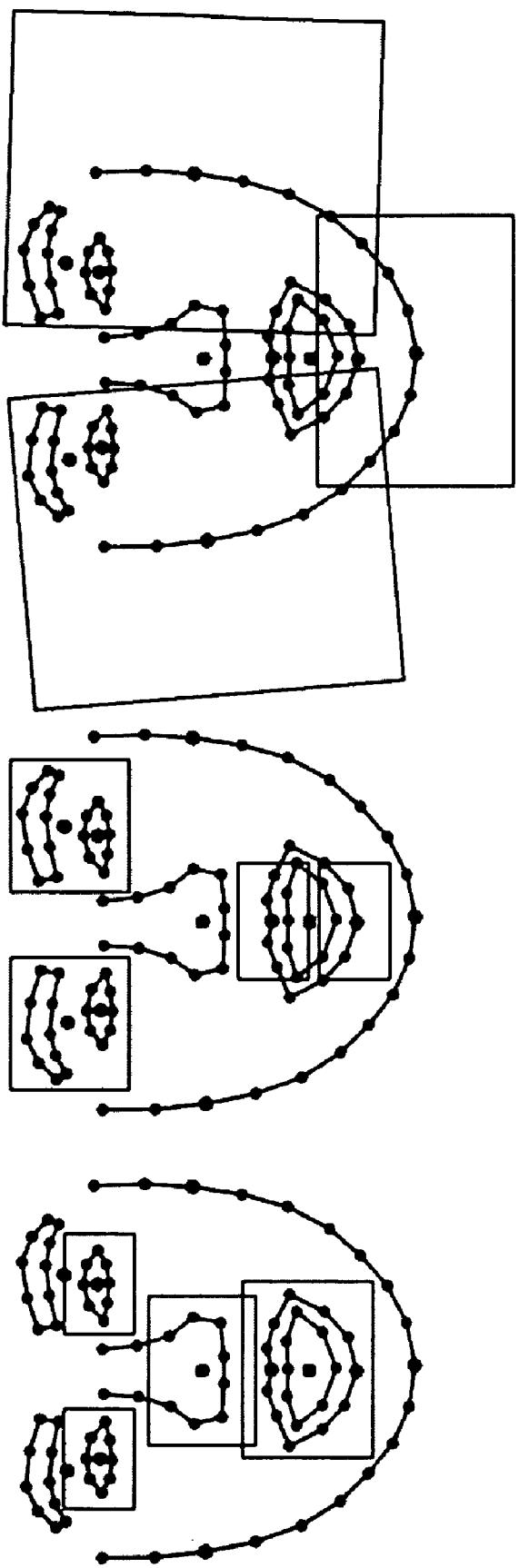
FIG. 2 is a representation of facial components that may be searched for face alignment.

In general, the problem of face alignment may be described as given an image I, locate a number of N facial feature points $S_f = \{s_i^f\}_{i=1}^N$ on the two-dimensional image. C facial component points are defined, $S_c = \{s_i^c\}_{i=1}^C$ FIG. 2 shows eleven facial components (features) that were used, as indicated by the eleven rectangles, namely eyes, brows, nose, mouth, upper/lower lips, left/right/lower profiles. Applying known PCA analysis on a set of training shapes in the tangent shape space, the face shape S=[Sf, Sc] can be expressed as:

$$S(p) = T(\bar{x} + Qb; t),\quad (1)$$

where $\bar{x}$ is the mean shape vector, Q is a shape basis matrix, b is a vector of tangent shape parameters, and T(•;t) is a global similarity transformation with parameters t. The shape parameters are denoted as p=[t, b].

To find the shape parameters p for a given image 1, an iterative searching algorithm is typically used in ASM and its variants: find an observed shape y by locally finding the best nearby match for each point; optimize the shape parameters p based on new matched points. In a second step, the following energy function is optimized:

$$E(p \mid y) = \Delta_y^T \sum_y^{-1} \Delta_y + \lambda \cdot b^T \sum_b^{-1} b, \quad (2)$$

where $\Delta_y = S(p) - y$ is the difference between estimated shape S(p) and the observed shape y, $$\sum_y^{-1}$$

is the image noise covariance matrix, $$\sum_b^{-1}$$

is the covariance matrix of the shape, and λ is a regularization factor. The shape parameters p can be optimized using an EM algorithm.

As described herein, the above model is sensitive to the initialization and does not always converge to the correct solution because the search is only performed in a small range in each iteration. A natural solution is to provide prior estimates of the position to constrain some of the shape points. Extra user-specified constraints can greatly improve the model. The technology described herein follows the general idea of detecting facial components and using multiple detected modes as constraints.

When the positions $\hat{S}_c = \{\hat{s}_i^c\}_{i=1}^C$ of facial components and corresponding variances $\{\sigma_i\}_{i=1}^C$ are detected, the component constraints are enforced to the energy function (2):

$$E'(p \mid y) = E(p \mid y) + \lambda_c \Delta_c^T \sum_c^{-1} \Delta_c^T, \quad (3)$$

where $\Delta_c = S_c(p) - \hat{S}_c$ is the difference of estimated component positions $S_c(p)$ with the constrained positions $\hat{S}$; covariance matrix $$\sum_c = \mathrm{diag}(\sigma_1^2, \ldots, \sigma_C^2)$$

models the uncertainty of detected positions, and $\lambda_c$ is a weighting parameter. However, component detectors are usually error-prone. Because the local patch alone is not discriminative enough, multiple modes may be detected or no mode may be detected for one component. Further, the detected modes are rather noisy and contain localization errors. Thus, the algorithm needs to be such that it effectively and efficiently handles multi-modes, noisy, and incomplete observations.

One approach is to sample each component's modes based on their confidence. However, the combinations of all modes of whole components may be large, which results in an inefficient algorithm. Moreover, the sampling approach is difficult to handle in the case that no correct mode is detected. However, the component-based discriminative searching algorithm is used to efficiently find very good configurations of components only in a small number of iterations.

Figure 3:
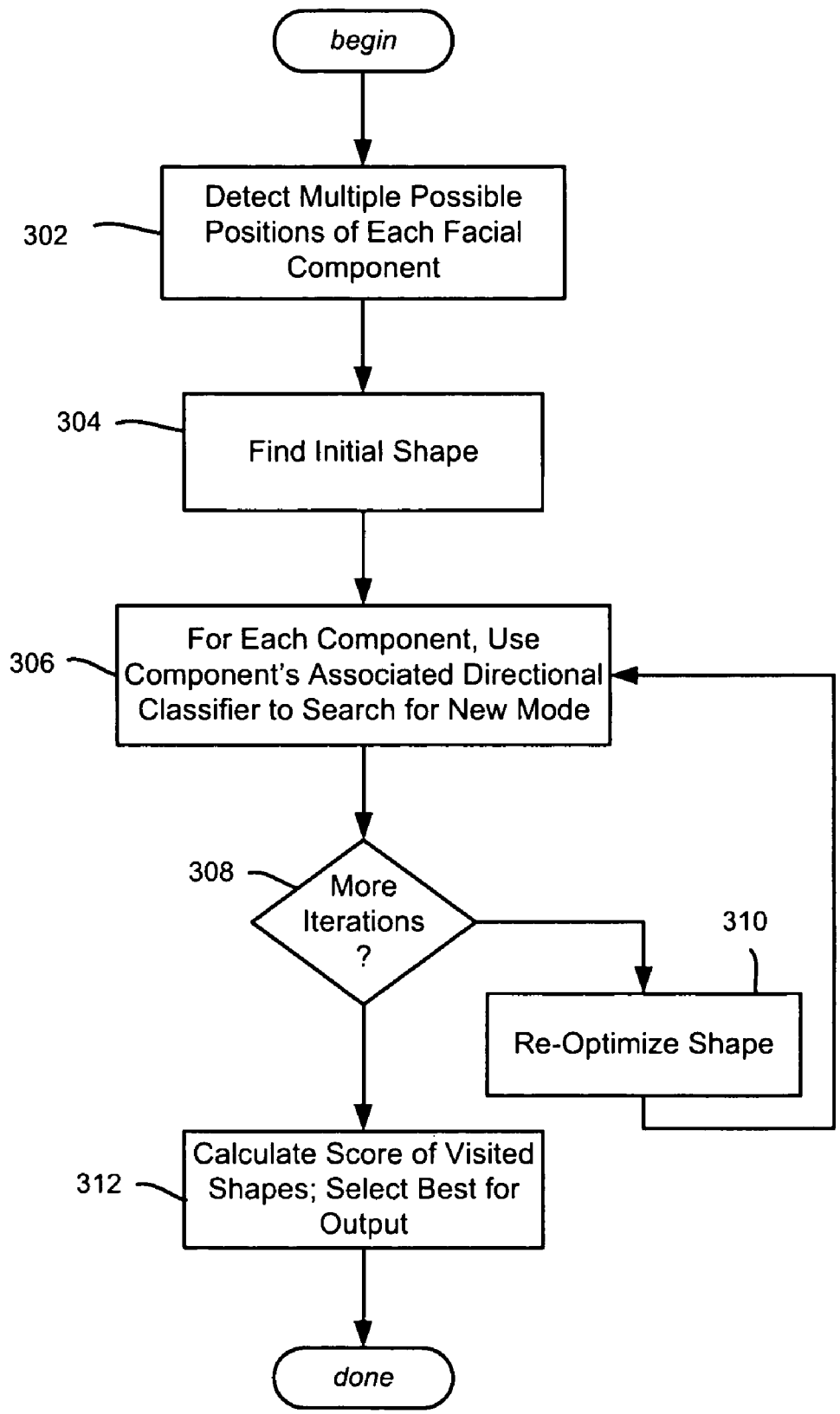
FIG. 3 is a flow diagram showing example steps for implementing face alignment via a component-based discriminative search.

With respect to an overview of the algorithm, and with reference to the example steps of FIG. 3, multiple possible positions of each facial component are first detected (that is, the modes) by a component detector (described below) at step 302. Using the best mode (based upon the largest weight) of each component as a constraint, the initial shape $S_0$ is searched (step 304) by minimizing the energy, equation (3). Then, starting from the initial shape, a new mode for each component is searched for (step 306) by a discriminative search algorithm. The searching detection is determined by boosted directional classifiers.

Using the new searched modes as constraints, the face shape is re-optimized at step 310, which is repeated for K iterations (via step 308). At step 312, the algorithm calculates the score f(Sk) of all visited shapes {S0, . . . , SK} using a known Boosted Appearance Model, which is a discriminative approach for evaluating the goodness of a fitted shape; the best one is selected for the final output.

The search algorithm with pseudo-code providing additional details is shown in Table 1:

TABLE 1

Detect the face
Detect the components' modes in the face region
Constrain each component at the mode with maximal weight, search an initial shape S0 using Eqn. (3).
for k = 1 to K
   For each component, perform discriminative search
     Determine the searching direction by directional classifiers
     Move the component to an appropriate position along the direction
   Search with new component constraints, get the shape $S_k$ by Equation (3)
   Evaluate the shape score f($S_k$)
The output shape S* = max$_{Sk}$ f($S_k$)

In one implementation, for each component, a component detector is trained using Harr wavelet features. The confidence output of the detector is defined as:

$$c = 1/(1 + \phi h \exp(-r)) \quad (4)$$

where r is the output score of the last strong classifier (at h-th layer) it passed, and $\phi_h$ is the ratio of negative examples to positive examples for the h-th layer (obtained during training process). A final confidence value c(x, y) at the position (x, y) is the sum of the confidences by all detectors at multiple scales. Thus, a set of points with confidence values is obtained. To reduce the number of candidate points, a Mixture of Gaussian (MoG) is fit on these points, using found maximums to initial the MoG fitting algorithm. Note that the confidence value is used as the weight of each point. Closed clusters are merged after fitting, and MoG's components are used for the detected modes $\{w(m_i), m_i\}$, where $w(m_i)$ and $m_i$ are weight and center of one cluster in MoG.

In the component-constraint optimization of Equation (3), a covariance matrix $c=\text{diag}(\sigma_i^2)$ models the uncertainty of detected mode. In one implementation, the variance is $$\sigma_i = \frac{1}{w(m_i) + \varepsilon},$$

where $\varepsilon$ is set to 0.01.

With respect to learning directional classifiers, one goal of a directional classifier is that when given a patch in a facial image, the search needs to know whether the patch is well-aligned with a specific facial component or not; if not, the relative direction between the patch and the facial component is desired. To achieve this goal, a discriminative approach is taken, to learn from training data.

Figure 4:
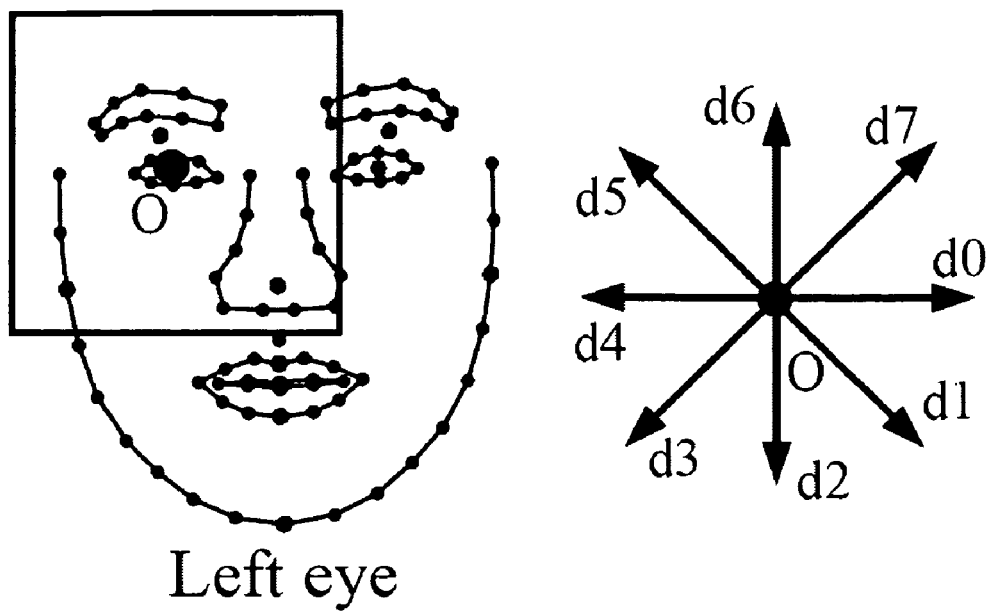
FIGS. 4-6 are representations of moving facial components relative to an image to perform face alignment via a discriminative search.

Patches from the data are divided into three classes based on the distance to the "true" position: well-aligned (<5 pixels distance), misaligned (>20 pixels distance), and the others. The others class is discarded as they are ambiguous. The misaligned patches are further divided into eight sets based on the eight discrete directions with respect to the "true" position. That provides nine sets of patches with known relative directions with respect to the true position, as shown in FIG. 4.

Using these training patches, nine classifiers are trained for the eight different directions (plus the direction of the well-aligned set, which is "no move"). For an individual direction, the corresponding patches are used as positive samples, and the other patches as negative samples.

Figure 5:
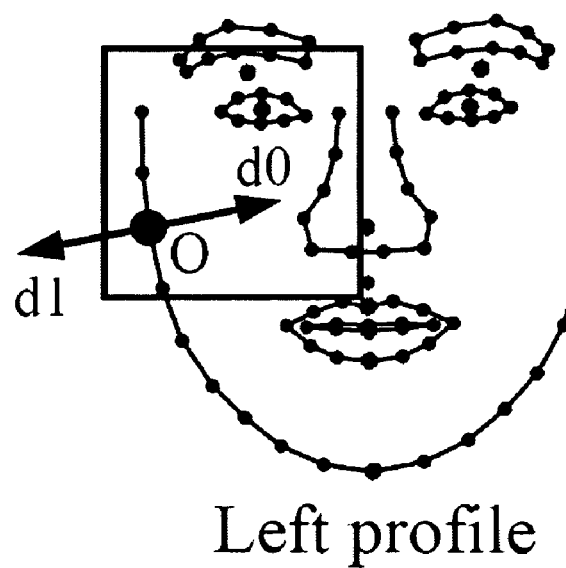
Figure 6:
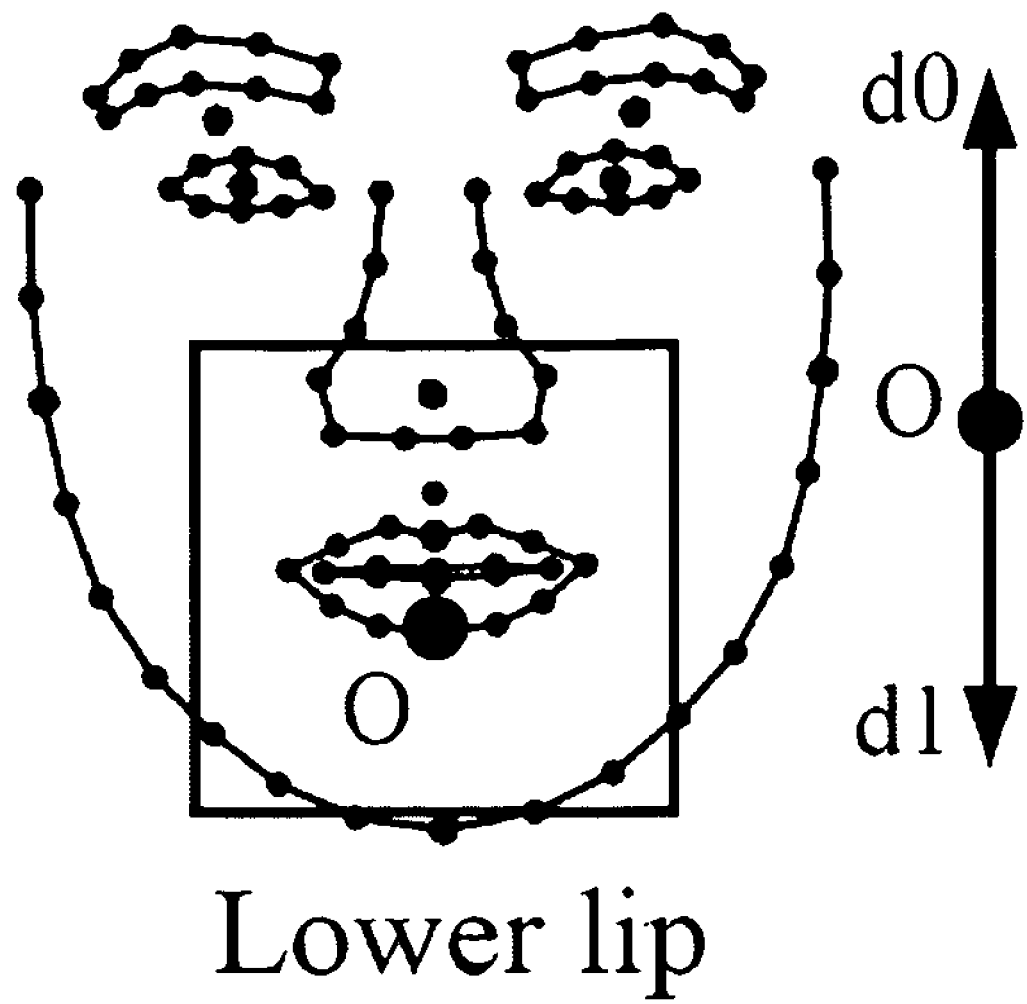

With respect to the component to which each classifier is associated, for left and right profiles, only three directions are considered, namely left, right, and no move. Brows and upper/lower lips may be treated as child components of the eyes and mouth, respectively; only up, down, and no move are considered since they are moved after the movements of eyes and mouth in the discriminative search. The example patches for these components are shown in FIGS. 5 and 6. Equipped with the directional classifiers, a discriminative search algorithm is able to effectively search new positions of facial components as described below.

To perform the discriminative search, given the current shape, the image is warped to the mean shape coordinates. For each component, the raw scores $[s(O), s(d_0), \ldots, s(d_8)]$ of the nine directional classifiers are calculated, for selecting the optimal direction with maximal score. Then the optimal direction is transformed back to the image coordinate. The optimal direction and position of the component under the image coordinate is denoted as $d^*=[d_x^*, d_y^*]$ and s, the associated score, as $s(d^*)$. Also defined is a set of modes M which are within the searching range of $d^*$, $$M=\{m_k | <m_k-s, d^*> \geq 0.7\} \quad (5)$$

Based on the above information, each component is searched as follow:

$$s(d^*) > 0 \text{ and } M \neq 0 \quad 1$$

The score of the direction is high and M is not empty. The algorithm moves the component to a mode in M. The algorithm selects the mode $m^*_k$ in M by considering both direction and the mode's weight $w(m_k)$:

$$m_k^* = \arg\max_{m_k} \{\langle m_k - s, d^* \rangle \cdot w(m_k)\} \quad (6)$$

The new mode $m^*_k$ is used as a constraint for the shape searching.

$$s(d^*) > 0 \text{ and } M = 0 \quad 2$$

The score of the direction is high but M is empty. In this case, the algorithm moves the component a constant step along the direction $d^*$. The step size is set as 0.1×face width. The new position constrains the shape searching. This strategy is designed to handle the situation that no correct mode is detected.

$$s(d^*) \leq 0 \quad 3$$

The score of the direction is low, which means that the directional classifier is not sure the proposed searching direction. In this case, the algorithm does not move the component and does not use component's position as the constraint. Notice that for the direction "no move", the algorithm only applies the last strategy.

The pseudo code of discriminative search for a single component is shown in Table 2:

TABLE 2

The pseudo code of discriminative search for an individual component:

Input: component's position s and weight w
Output: component's new position s' and weight w'
    Find the optimal direction d* with maximal classifier score s(d*)
    if the direction is "no move"
        s' = s
        if s(d*) > 0
            w' = w,
        else
            w' = 0
    else (other directions)
        construct the mode set M = $\{m_k | (m_k - s), d^*) \geq 0.7\}$
        if M ≠ 0
            select best mode $m_k^* = \text{argmax}_{mk}\{(m_k - s), d^*) \cdot w(m_k)\}$
            s' = $m_k^*$
            w' = $w(m_k^*)$
        else
            s' = s + 0.1 · FaceWidth · d*
            w' = 1

Due to the hierarchical nature of the facial components, a two-level searching scheme is used. The scheme first searches for eyes, nose, mouth and profiles at the top level. Brows and upper/lower lips are only searched when their parent components (brows are children of eyes, and lips are children of mouth) are judged as "no move". The discriminative search also has the capability to handle the case that no correct mode is detected for partial facial components.

Exemplary Operating Environment

Figure 7:
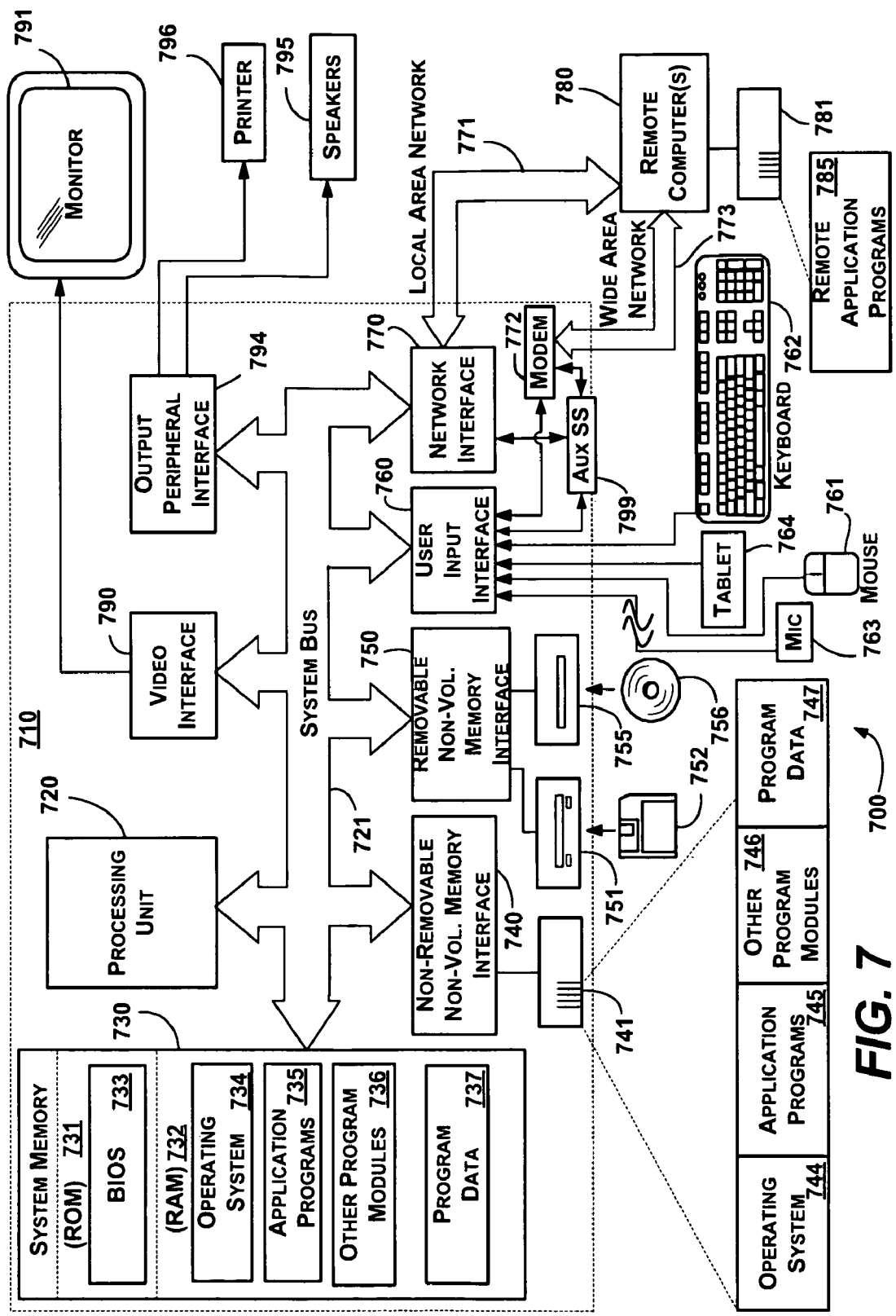
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising: searching an image for positions of facial components, including, (a) finding an initial shape, (b) for each component, starting at an initial component position and determining a direction to move the component to a new position or not to move the component; (c) re-optimizing the shape into a visited shape based on the positions of each component including computing a score for the visited shape; (d) returning to step (b) until a number of iterations is reached; and (e) selecting a shape from among the visited shapes based on respective scores of the visited shapes.

2. The method of claim 1 further comprising, detecting multiple possible positions for each facial component.

3. The method of claim 1 wherein determining the direction to move the component or not to move the component comprises accessing a directional classifier corresponding to that component.

4. The method of claim 3 further comprising training each directional classifier.

5. The method of claim 4 wherein training the directional classifiers includes training directional classifiers that correspond to a profile component to provide only left, right directions and not move directions.

6. The system of claim 1, wherein the searching comprises using a discriminative search algorithm.

7. In a computing environment, a system comprising, a face alignment mechanism, including a discriminative search mechanism that searches an image to obtain face alignment data, including by selecting at least one facial component to search with respect to the image, wherein the at least one facial component comprises at least one of an eyes component, a brows component, a nose component, a mouth component, an upper lips component, a lower lips component, a left profile component, a right profile component or a lower profile component, accessing a directional classifier associated with that component to determine whether to move the facial component relative to the image to improve alignment, and if so, in which direction, and a shape selection mechanism that selects a shape corresponding to alignment data.

8. The system of claim 7 wherein when the component is a left profile component or a right profile component, the associated directional classifier is only configured to not move, or to move only in a left or right direction.

9. The system of claim 7 wherein brows component is a child of the eyes component, the discriminative search mechanism searching the eyes component and only searching to move the brows component when the eyes component is determined to be not moved by the directional classifier associated with the eyes component.

10. The system of claim 7 wherein the upper or lower lips components are each a child of the mouth component, the discriminative search mechanism searching the mouth component and only searching to move the upper or lower lips components when the mouth component is determined to be not moved by the directional classifier associated with the mouth component.

11. The system of claim 7 further comprising, a component detector that detects possible positions for each facial component at a start of searching.

12. The system of claim 7, including training each directional classifier.

13. One or more hardware computer storage media having computer-executable instructions stored thereon, which in response to execution by a computer, cause the computer to perform steps, comprising, for each component of a set of facial components, each component comprising a set of at least two data points, determining a direction to move the facial component to a new position relative to an image or to not to move the component, determining a set of visited shapes based on the positions of the facial components, computing a score for each visited shape, and selecting a shape based on a best computed score.

14. The one or more hardware computer storage media of claim 13 having further computer-executable instructions comprising, re-optimizing the shape into a visited shape based on the positions of each component, and iterating to obtain the set of visited shapes.

15. The one or more hardware computer storage media of claim 13 wherein determining the direction to move the facial component comprises accessing a directional classifier associated with that facial component.

16. The one or more hardware computer storage media of claim 15 having further computer-executable instructions comprising training each directional classifier.

17. The one or more hardware computer storage media of claim 16 wherein training the directional classifiers that correspond to a profile component to provide only left, right direction and not move directions.

18. The one or more hardware computer storage media of claim 13 wherein determining the direction to move the facial component to a new position relative to an image or not move the facial component comprises identifying parent facial components and child facial components, and only determining whether to move a child facial component when a corresponding parent facial component to that child component has been determined to be not moved relative to the image.

19. The one or more hardware computer storage media of claim 13 wherein determining whether to move the facial component comprises searching based on enforcing constraints of an energy function.

20. The one or more hardware computer storage media of claim 13 having further computer-executable instructions comprising computing an initial shape.

* * * * *